US010530872B1

(12) United States Patent
    Beach (10) Patent No.: US 10,530,872 B1
(45) Date of Patent: Jan. 7, 2020

(54) METHODS AND SYSTEMS FOR DETERMINING SCREEN-READER USE

(71) Applicant: FACEBOOK, INC., Menlo Park, CA (US)

(72) Inventor: Jesse Renee Beach, Redwood City, CA (US)

(73) Assignee: FACEBOOK, INC., Menlo Park, CA (US)

( * ) Notice: Subject to any disclaimer, the term of this patent is extended or adjusted under 35 U.S.C. 154(b) by 125 days.

(21) Appl. No.: 15/404,033

(22) Filed: Jan. 11, 2017

(51) Int. Cl.
    *H04L 29/08* (2006.01)
    *H04L 29/06* (2006.01)

(52) U.S. Cl.
    CPC .............. *H04L 67/16* (2013.01); *H04L 67/02* (2013.01); *H04L 67/10* (2013.01); *H04L 67/42* (2013.01)

(58) Field of Classification Search
    CPC ......... H04L 67/02; H04L 67/10; H04L 67/16; H04L 67/42
    See application file for complete search history.

(56) References Cited

U.S. PATENT DOCUMENTS

| 8,237,665 | B2 * | 8/2012 | Duncan | G06F 3/0488 345/173 |
| 8,607,251 | B1 * | 12/2013 | Guillory | G09B 21/00 719/318 |
| 2011/0093819 | A1 * | 4/2011 | Irvine | G06F 3/038 715/856 |
| 2015/0220417 | A1 * | 8/2015 | Diment | G06F 11/3438 709/224 |
| 2015/0281263 | A1 * | 10/2015 | McLaughlin | G06Q 30/0248 726/22 |
| 2016/0269468 | A1 * | 9/2016 | Malpass | H04L 67/02 |

* cited by examiner

*Primary Examiner* — Jason D Recek
(74) *Attorney, Agent, or Firm* — Morgan, Lewis & Bockius LLP (57) ABSTRACT

Methods, systems, and/or devices for determining that a user uses an assistive-technology program (such as a screen reader) for interacting with a web-based service are described. In some embodiments, this includes identifying a trigger event transmitted from a browser on a client device and identifying an inconsistency in the trigger event that correlates with use of an assistive-technology program in conjunction with the browser on the client device. In response to identifying the inconsistency, the method, system, or device may flag a user of the client device as a user of the assistive-technology program; and in response to flagging the user of the client device as a user of the assistive-technology program, provide content that is compatible with the assistive-technology program to the client device.

12 Claims, 7 Drawing Sheets

METHODS AND SYSTEMS FOR DETERMINING SCREEN-READER USE

TECHNICAL FIELD

The disclosed implementations relate generally to determining whether a user of a computer is using screen reading technology.

BACKGROUND

Most people generally interact with computers through the use of a keyboard and/or a mouse to input information into the computer and through a display screen to receive information from the computer. However, people with blindness or severe sight impairment are often unable to use a display screen to interact with a computer. Accordingly, many such people rely on assistive-technology programs such as screen readers to receive information from computer systems.

A screen reading assistive-technology program reads the content on a screen aloud, so that it can be heard by a person who is unable to view the screen. Such programs are not limited to use by sight-impaired people, but the majority of users of screen reading programs have some level of sight impairment. There are multiple screen reading programs available, including Job Access With Speech ("JAWS") from Freedom Scientific, Window-Eyes from GW Micro, Dolphin Supernova by Dolphin Computer Access, and open-source products such as NonVisual Desktop Access ("NVDA").

When using web-based services, such as a social media platform, a computer user typically accesses these services through a web browser, such as Microsoft's Edge or Internet Explorer, Google's Chrome, Apple's Safari, or Mozilla's Firefox. This process is known in the art and generally involves having a web-based service send content over a network to the browser, which displays the content. The browser then sends back text, clicks, and other user-provided content, allowing the user to interact with the service.

To allow sight-impaired users access to web-based services, many screen-reading programs work with one or more web browsers to read the content sent by the web service. Similarly, these programs (along with other assistive-technology programs such as voice-recognition software like Nuance Communication's Dragon Naturally Speaking) work with or through the browser to send text and clicks back to the web-based service based on verbal instructions by the user. For example, a user may say "click on <some link>," and the program will "click" on that link.

While assistive-technology programs, such as screen readers, have become more advanced and are capable of parsing complex web pages, because these programs are often incapable of determining which parts of a web page should be read first (and which parts should be skipped entirely), the screen-reading experience is often less efficient and less engaging than a traditional screen-viewing experience. This creates difficulties for web-based systems because the services wish to create even more complex and visually-appealing web pages to attract and retain users, but do not want to prevent assistive-technology programs from being able to use them.

SUMMARY

Accordingly, there is a need for a method for a web-based service to determine if a user is using a screen-reading assistive-technology program so that the web service can provide screen-reading users with web pages that are easier for their screen-reading software to parse. From the perspective of a web service, a screen reader is generally passive, in that a web server cannot determine whether content it sent to a client computer is being displayed on a screen or read by a screen reader. However, users of screen readers to audibly read content on screens generally use the assistive-technology to interact with the web services. Accordingly, there is a need to identify assistive-technology programs used to send data (text, clicks, etc.) to a web service. Further, there is a need to determine the type(s) of assistive-technology program being used by the user.

In accordance with some embodiments, a method is performed at a client device with one or more processors and memory storing instructions for execution by the one or more processors. The method includes identifying a trigger event transmitted from a browser on a client device. The method further comprises identifying an inconsistency in the trigger event, wherein the inconsistency correlates with use of an assistive-technology program in conjunction with the browser on the client device. The method further comprises, in response to identifying the inconsistency, flagging a user of the client device as a user of the assistive-technology program. The method comprises, in response to flagging the user of the client device as a user of the assistive-technology program, providing content that is compatible with the assistive-technology program to the client device.

In accordance with some implementations, an electronic system includes one or more processors and memory storing one or more programs configured to be executed by the one or more processors. In some embodiments, a client will interact with the electronic system. The one or more programs include instructions for performing the operations of the method described above. In accordance with some implementations, a non-transitory computer-readable storage medium has stored therein instructions that, when executed by the electronic system, cause the presentation device to perform the operations of the method described above.

Thus, users of screen-reading programs are provided with content that is compatible with their screen-reading programs.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings and specification.

DETAILED DESCRIPTION

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to obscure aspects of the implementations unnecessarily.

It will also be understood that, although the terms first, second, etc. are, in some instances, used herein to describe various elements, these elements should not be limited by these terms. These terms are used only to distinguish one element from another.

The terminology used in the description of the various implementations described herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

As used herein, the term "exemplary" is used in the sense of "serving as an example, instance, or illustration" and not in the sense of "representing the best of its kind."

Figure 1:
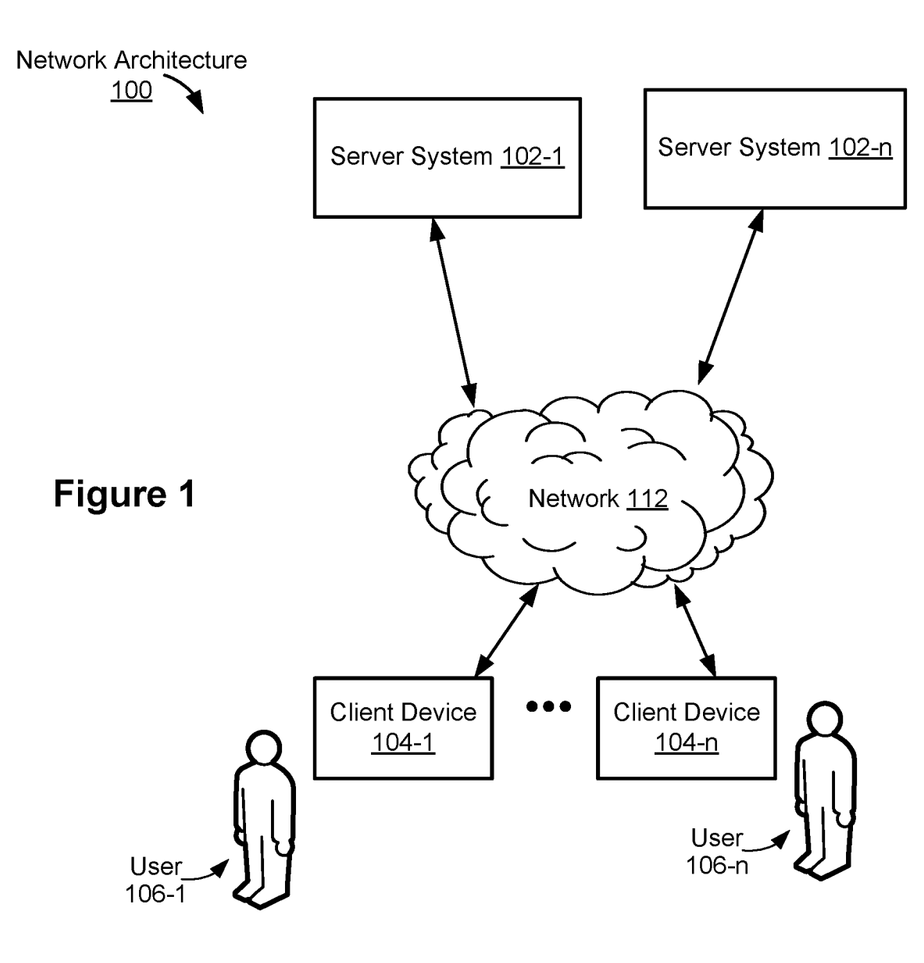
FIG. 1 is a block diagram illustrating an exemplary network architecture in accordance with some implementations.

FIG. 1 is a block diagram illustrating an exemplary network architecture 100 in accordance with some implementations. The network architecture 100 includes one or more clients 104-1 . . . 104-n (where n is an integer greater than or equal to one) and one or more server systems 102. One or more networks 112 communicably connect each component of the network architecture 100 with other components of the network architecture 100. In some implementations, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

A client 104 (e.g. 104-1, 104-2, . . . 104-n) is associated with one or more users 106 (e.g., 106-1, 106-2, . . . 106-n). In some implementations, a client 104 is a personal computer, a mobile electronic device, a wearable computing device, a laptop, a tablet computer, a mobile phone, a feature phone, a smart phone, a digital media player, or any other device capable of capturing and/or transmitting data. In some implementations, clients 104 include input devices 208 for receiving user inputs (e.g., keyboards or mice for receiving a first version and a second version of an API and/or an application name, which the clients may store and/or transmit to other components of the network architecture 100, such as the server system 102). Clients 104 may be the same type of device (e.g., all desktop personal computers), or may comprise different types of devices.

Users 106 employ clients 104 to execute functions, such as functions related to social media systems. In some embodiments, functions may be executed entirely on the clients 104. In some such embodiments, the client 104 may not be connected to a network 112 or may be disconnected from the network 112 temporarily.

In some embodiments, the client 104 will send a function request to a server system 102, which will perform the requested function, and the client will display the result. For example, the request may ask the server to return a message. The clients 104 may access the server systems 102 through various means via network 112. For example, in some embodiments, a client 104 executes a web browser application that can be used to access a social media service hosted by the server system 102. For another example, in some embodiments, the client 104 may execute a software application that is specific to the social media service (e.g., an "app" running on a smart phone, tablet, or other device).

In some embodiments, the server system 102 stores and provides content (via the network(s) 112) to the users 106 via the client 104. Content stored and served by the server system 102, in some implementations, includes lists of functions, user data, and content necessary to perform the functions.

The description of the server system 102 as a "server" is intended as a functional description of the devices, systems, processors, and/or other components that provide the functionality attributed to the server system 102. It will be understood that the server system 102 may be a single server computer or multiple server computers. The server system 102 may be coupled to other servers and/or server systems, or other devices, such as other user devices, databases, content delivery networks (e.g., peer-to-peer networks), network caches, and the like. In some embodiments, the server 102 may communicate with other, unaffiliated, servers. In some implementations, the server system 102 is implemented by multiple computing devices working together to perform the actions of a server system (e.g., cloud computing). Furthermore, any functionalities performed by the server system 102 may also be performed additionally, alternatively, and/or concurrently by the one or more clients 104. For example, some keyword functions may be fully executable on a client device 104 without the need to communicate with a server 102.

Clients 104 and the server system 102 may be communicably coupled in a variety of ways. In some implementations, multiple clients 104 send requests to perform various functions to a server system 102 via a network 112. In response to receiving the requests, the server system 102 may return the requested information to the client 104.

Figure 2:
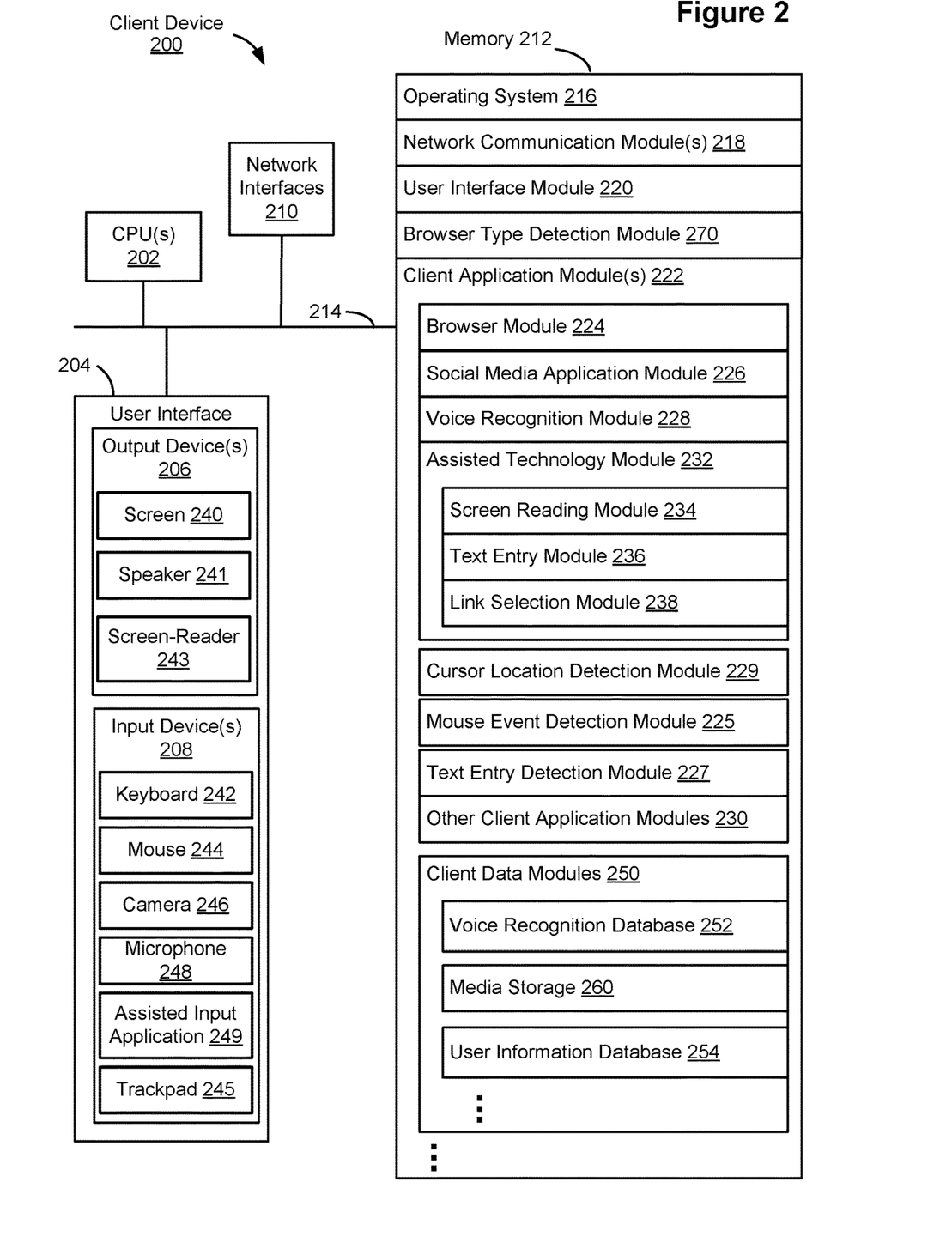
FIG. 2 is a block diagram illustrating an exemplary client in accordance with some implementations.

FIG. 2 is a block diagram illustrating an exemplary client 200 (e.g., 104-1 . . . 104-n, FIG. 1) in accordance with some implementations. The client 200 typically includes one or more central processing units (CPU(s), e.g., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

As also shown in FIG. 2, the client 200 typically includes a user interface 204, including output device(s) 206 and input device(s) 208. In some embodiments, output devices 206 comprise a screen 240, speaker 241, or screen-reader 243. In some embodiments, the speakers 241 may be headphones or earbuds external to the client 200. Such headphones or earbuds may connect to client 200 via a cord or may communicate with the client 200 through a wireless protocol or network via a network interface 210. In other embodiments, speakers 241 may comprise internal "built-in" speakers in the client 200. In some embodiments, client 200 may have multiple speakers 241. Screen reader 243 may be a physical device or may be a software application. In some embodiments, screen reader 243 may comprise both a physical device and a software application. In some embodiments, screen reader 243 will generate output through speaker 241. In other embodiments, screen reader 243 may have its own output mechanism, such as its own speaker.

In some implementations, the input devices 208 include one or more of a keyboard 242, mouse 244, trackpad 245, camera 246, microphone 248, or assisted input application 249. Alternatively, or in addition, the user interface 240 may include a display device that may include a touch-sensitive surface, in which case the screen 240 may also comprise a touch-sensitive display (e.g., a "touchscreen"). In user devices that have a touch-sensitive display, a physical keyboard is optional (e.g., a soft keyboard may be displayed when keyboard entry is needed). Furthermore, some user devices 102 may use a microphone 248 and an assisted input application 249 to supplement or replace the keyboard 242. In some embodiments, the microphone 248 may be a "built-in" condenser microphone located inside the client 200. In some embodiments, microphone 248 may comprise an external microphone, connected to client 200 via a cord or through a wireless protocol or network via a network interface 210. In some embodiments, client 200 will contain multiple microphones 248.

The assisted input application 249 may comprise voice recognition software to receive audible input via a microphone 248. The assisted input application 249 may transcribe the received sounds (such as a spoken language) into text which is then input to client 200 in a similar manner to text input through a keyboard 242. The assisted input application 249 may also accept commands to perform actions commonly performed by a mouse 244 or trackpad 245, such as moving a cursor or "clicking" on an object (or text). For example, an assisted input application 249 may receive a verbal command to "move cursor to <somewhere>" or to "click on <some link>" and will take the appropriate action(s), such as moving the cursor or "clicking" on the link. It should be noted that assistive input application 249 may process commands such as "click" commands differently than mice 244 or trackpads 245. For example, while, generally, a mouse 244 can click only where a cursor is located, an assistive input application 249 may be capable of clicking elsewhere on or off of the display. For example, if a user 106 (FIG. 1) issued a command to "click on <some image>," assistive input application 249 may "click" on the specified image without moving the cursor to that image. Assisted input application 249 may be a physical device or may be a software application. In some embodiments, assisted input application 249 may comprise both a physical device and a software application. In some embodiments, assisted input application 249 will receive input from microphone 248. In other embodiments, assisted input application 249 may have its own input mechanism, such as its own microphone.

In some implementations, the one or more network interfaces 210 include wireless and/or wired interfaces for receiving data from and/or transmitting data to a server system 102 and/or other devices or systems. In some implementations, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some implementations, data communications are carried out using any of a variety of custom or standard wired protocols (e.g., USB, Firewire, Ethernet, etc.). For example, in some implementations, the one or more network interfaces 210 includes a wireless LAN (WLAN) interface for enabling data communications with the server system 104 (via the one or more network(s) 112, FIG. 1).

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some implementations, memory 212 or the non-transitory computer-readable storage medium of memory 212 stores the following programs, modules, and data structures, or a subset or superset thereof:

- an operating system 216 that includes procedures for handling various basic system services and for performing hardware dependent tasks;
- a browser type detection module 270 for determining the type of browser 224 used on the client 200;
- network communication module(s) 218 for connecting the client 104 to other computing devices (e.g., server system 102) via the one or more network interface(s) 210 (wired or wireless);
- a user interface module 220 that receives commands and/or inputs from a user 106 via the user interface 204 (e.g., from input devices 208), and provides outputs for display by the user interface 204 (e.g., the output devices 206); and
- one or more client application modules 222, including the following modules (or sets of instructions), or a subset or superset thereof:
    - a web browser module 224 (e.g., Internet Explorer or Edge by Microsoft, Firefox by Mozilla, Safari by Apple, or Chrome by Google) for accessing, viewing, and interacting with web sites (e.g., a social-networking web site provided by the server system 102),
    - a social media application module 226 for allowing a user 106 to access a social media system;
    - a voice recognition module 228, to receive and parse spoken language;
    - assisted technology module(s) 232 for performing tasks related to providing assisted access to computer input and output functions, including but not limited to:
        - a screen reading module 234 for converting content on a screen 240 into audible/spoken word;

a text entry module 236 for accepting verbal entry of text; and a link selection module 238 for accepting verbal commands to select or "click" on a link, such as links from browser module 224 or social media application module 226;

a cursor location detection module 229 for determining the location of a cursor on screen 240;

a mouse event detection module 225 for determining the occurrence of mouse events, including, but not limited to events generated by mouse 244, trackpad 245, or assisted input application 249;

a text entry detection module 227 for detecting the entry of text, including, but not limited to, events generated by keyboard 242, assisted input application 249, text entry module 236, or voice recognition module 228.

one or more client data module(s) 250 for handling the storage of and access to content, including but not limited to:

media storage 260, for storing media, including waveform or other audio data used to map words into spoken language;

a voice recognition database 252, containing data to map waveforms (such as those generated by speech in one or more languages or dialects) or other audio data into text; and a user information database 254, for containing information regarding 106;

other optional client application module(s) 230, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D gaming, virtual reality, electronic book reader, and/or workout support.

Figure 3:
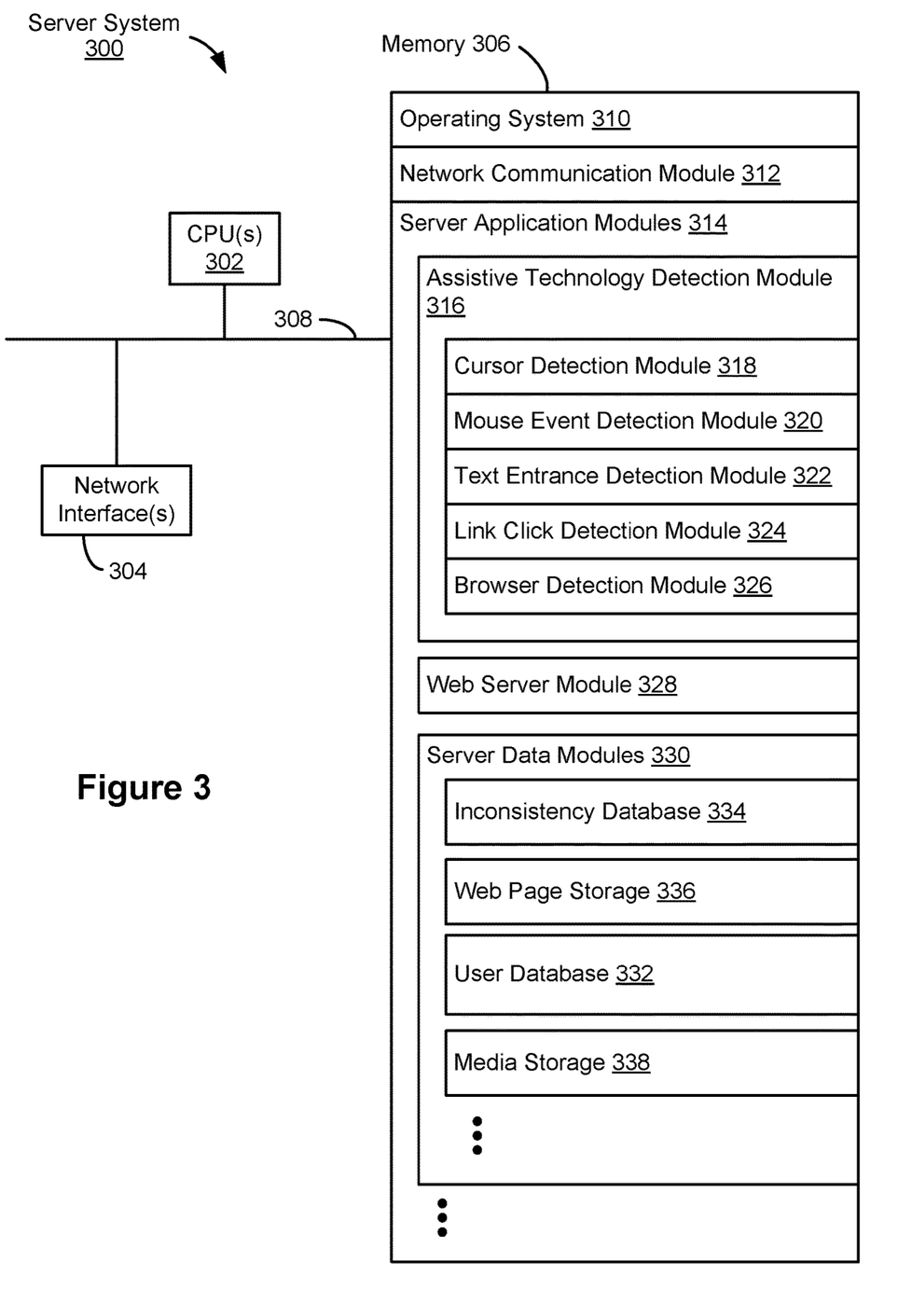
FIG. 3 is a block diagram illustrating an exemplary server system in accordance with some implementations.

The optional browser type detection module 270 provides functions for detecting the type of browser 224 being used on client 200. The "type" of browser may include data including the name of the browser 224 (e.g., Chrome or Firefox), the version of the browser (e.g., 1.1 or 2.0), configuration, or other information. In some embodiments, this data will include the operating system 310 of the client 200. Other browser-related data may also be detected. For example, information indicating the screen resolution or the size and/or fonts of text may be detected. This data may be stored in a client data module 250. In some embodiments, the browser type data may be associated with a user 106 (FIG. 1) and stored in user information database 254 or in user database 332 (FIG. 3).

The optional voice recognition module 228 monitors waveforms, such as those from sound to detect spoken language. In some embodiments, voice recognition module 228 will convert the spoken language into text (such as text to be input by text entry module 236) or commands (such as commands to direct assisted application 249). In some embodiments, such commands may include a command to "click" on a link using link selection module 238. In some embodiments, voice recognition module 228 may be a part of assisted input application 249. In some embodiments, it may be a part of an assisted technology module 232. In some embodiments, it may be a component of a screen reader 243, such as JAWS, Dolphin, or NVDA. In some embodiments, it may comprise a stand-alone commercial application, such as Dragon NaturallySpeaking.

Optional cursor location detection module 229 detects the location of a cursor on a screen, such as screen 240. In some embodiments, it will report on an absolute location of a cursor on a screen 240 (or on a system for a multi-screen computer containing multiple screens 240). In some embodiments, it will report a relative screen location such as the location of a cursor on a secondary (or tertiary) screen 240 or on a window on screen 240. In some embodiments, cursor location module 229 will report whether the cursor is located on an object (such as an image) on a screen or window. In some embodiments, cursor location detection module 229 (or another client application module 222) will send these events to a cursor detection module 318 (FIG. 3) on a server 300.

Optional assisted technology module 232 provides features useful to a user 106 with a disability such as sight impairment. In some embodiments, optional assisted technology module 232 includes a screen reading module 234 that reads text displayed on a screen 240. In some embodiments it may also read meta-data related to the text, such as data describing the font, size, or style of the text or its location on the screen or a window. In some embodiments, screen reading module 234 may be a component of a commercial (or open-source) disability program such as JAWS, Dolphin, or NVDA. In some embodiments, it may be a function of or be associated with a physical device, such as a screen reader 243. In some embodiments, optional assisted technology module 232 includes a text entry module 236. Text entry module 236 allows for the entry of text from an assisted input application 249. In some embodiments, text entry module 236 may be a part of a physical assisted input application 249 device. In some embodiments, text entry module 236 may comprise (or be a component of) a voice recognition module 228, such as Dragon NaturallySpeaking. In some embodiments, assisted technology module 232 may comprise a link selection module 238, which allows the selection of a "link" on a web browser module 224 or social media application module 226.

The optional mouse event detection module 225 detects mouse events. These events may be generated by mice 244, trackpads 245, or assisted input applications 249. These events may include, but are not limited to, mouse-up, mouse-down, mouse-click, light press (tap), and strong press. In some embodiments, mouse event detection module 225 will also detect events or meta-data related to mouse events, such as indications that an event is (or is not) reliable. In some embodiments, mouse event detection module 225 (or another client application module 222) will send these events to a mouse event detection module 320 (FIG. 3) on a server 300.

The optional text entry detection module 227 detects the entry of text by a user 106. In some embodiments, text entry may be from a keyboard 242 (physical or virtual) or an assisted input application 249. In some embodiments, text entry detection module 227 will detect text from the text entry module 236 component of the assisted technology module 232.

Voice recognition database 252 stores and indexes waveform and/or other audio data sufficient to generate text based on spoke language. In some embodiments, the waveform data will include data with respect to various languages such as English, Spanish, or Chinese. In some embodiments, waveform data will include data with respect to language dialects, such as Southern, Northeastern, or Texan for English. In some embodiments, the database may be updated based on waveforms read by voice recognition module 228 for a specific user 106. It may comprise one or more types of databases, such as text, graph, dimensional, flat, hierarchical, network, object-oriented, relational, distributed, and/or XML, databases. In some embodiments, voice recognition database 252 may be accessed publically. In other embodiments, voice recognition database 252 may be accessed only by assisted input application 249, voice recognition module 228, one or more assisted technology modules 232, social media application module 226 and/or other client application modules 230. In some embodiments, this database may be encrypted.

Optional user information database 254 contains information related to users 106 of clients 200. In some embodiments, this data will comprise demographic data regarding the users 106. In some embodiments, it may comprise information about what types of browser modules 224 are used by the users 106. In some embodiments, this data may be updated by browser type detection module 270. It may comprise one or more types of databases, such as text, graph, dimensional, flat, hierarchical, network, object-oriented, relational, distributed, and/or XML databases. In some embodiments, user information database 254 may be accessed publically. In other embodiments, user information database 254 may be accessed only by assisted input application 249, one or more assisted technology modules 232, social media application module 226 and/or other client application modules 230. In some embodiments, this database may be encrypted.

Although FIG. 2 illustrates client 200 in accordance with some implementations, FIG. 2 is intended more as a functional description of the various features that may be present in one or more clients 200 than as a structural schematic of the implementations described herein. In practice, items shown separately could be combined and some items could be separated. For example, some items shown separately in FIG. 2 could be implemented in single applications and single items could be implemented by one or more applications. The actual number of applications used to implement the client 200, and how features are allocated among them, will vary from one implementation to another.

Similarly, some hardware items shown separately could be combined and some items could be split into multiple hardware items. For example, assisted input application 249 may contain its own sound sampling device, or may use microphone 248. For another example, screen reader 243, if implemented as a physical device, may have its own microphone and/or sound generating equipment, or may use one or more microphones 248 and/or speakers 241 of client 200. Further, some components could be implemented as hardware, as software, or as a combination of hardware and software. For example, assisted input application 249 may be a physical device or may be a software application. When assisted input application 249 is a physical device, it may work in conjunction with voice recognition module 228. In some embodiments, voice recognition module 228 may be a component of assisted input application 249. For simplicity, in describing the voice entry function in method 400 (FIG. 4), infra, the voice command and voice-based text entry technology will be described as being implemented by assisted input application 249, but one of skill in the art will appreciate that the invention equally covers pure software and device-software hybrid types of voice command technology. For another example, screen reader 243 may be implemented as a physical hardware device or as a software application, such as screen reading module 234, or as a combination of hardware and software. For simplicity, in describing the screen reading function in method 400, infra, the screen reading technology will be described as being implemented by physical screen reader 243, but one of skill in the art will appreciate that the invention equally covers pure software and device-software hybrid types of screen reading technology.

FIG. 3 is a block diagram illustrating an exemplary server system 300 (e.g., server 102-1, 102-n, FIG. 1) in accordance with some implementations. The server system 300 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306, optionally, includes one or more storage devices remotely located from one or more CPUs 302. Memory 306, or, alternatively, the non-volatile solid-state memory device(s) within memory 306, includes a non-transitory computer-readable storage medium. In some implementations, memory 306, or the non-transitory computer-readable storage medium of memory 306, stores the following programs, modules, and data structures, or a subset or superset thereof:

- an operating system 310 that includes procedures for handling various basic system services and for performing hardware dependent tasks;
- a network communication module 312 that is used for connecting the server system 300 to other computing devices (e.g., clients 200 (FIG. 2) or other server systems 300) via one or more network interfaces 304 (wired or wireless) connected to one or more networks 112 (FIG. 1) such as the Internet, other WANs, LANs, PANs, MANs, VPNs, peer-to-peer networks, content delivery networks, ad-hoc connections, and so on;
- one or more server application modules 314 for enabling the server system 300 to perform various functions, the server application modules 314 including, but not limited to, one or more of:
  - an assistive technology detection module 316 for providing assistive technology services to users 106 of clients 200;
  - a cursor detection module 318, for detecting the location of a cursor on or off of a screen 240 (FIG. 2) of a client 200;
  - a mouse event detection module 320, for detecting a mouse event from a client 200;
  - a text entrance detection module 322, for detecting the entry of text on a client 200;
  - a link click detection module 234, for detecting that a client 200 has clicked on a link sent to the client, such as by web server module 328; and
  - a browser detection module 326, for detecting the type of browser module 224 (FIG. 2) used by client 200;
- an optional web server module 328, for serving web pages to a client 200 or another server 300;
- one or more server data module(s) 330 for handling the storage of and access to content, including but not limited to:
  - a user database 332, for storing user data;
  - an inconsistency database 334, for storing inconsistencies that may be used by assistive technology detection module 316 to determine that a user 106 of a client 200 is using an assistive-technology program;

media store 338, for storing media data, including, but not limited to media served by web server module 328;

web page storage 336, for storing web pages, including, but not limited to pages served by web server module 328;

The optional cursor detection module 318 detects the location of a cursor on a screen 240 (FIG. 2) of a client 200. In some embodiments, cursor detection module 318 will work in conjunction with cursor location detection module 229 (FIG. 2). In some embodiments, the location of the cursor will be sent to cursor detection module 318 by cursor location detection module 229.

The optional mouse event detection module 320 detects "mouse" events of a client 200 (FIG. 2). These events may be generated by mice 244, trackpads 245, or assisted input applications 249 of clients 200. These events may include, but are not limited to, mouse-up, mouse-down, mouse-click, light press (tap), and strong press. In some embodiments, mouse event detection module 225 will also detect events or meta-data related to mouse events, such as indications that an event is (or is not) reliable. In some embodiments, mouse event detection module 320 will work in conjunction with mouse event detection module 225 (FIG. 2). In some embodiments, the event will be sent to mouse event detection module 320 by mouse event detection module 225.

The optional link click detection module 324 detects links clicked by a user 106 (FIG. 1) of client 200 (FIG. 2) on web pages. In some embodiments, it will also detect selections of other UI elements in a browser 224, such as radio boxes, checkboxes, text boxes, buttons, etc. In some embodiments, click detection module 324 may detect clicks on UI elements on a screen 240. In some embodiments, the web pages will be served to the client 200 by web server module 328 and web server module 328 will report the click to link click detection module 324. In some embodiments, link click detection module 324 will work in conjunction with link selection module 238 (FIG. 2). In some embodiments, the indication of the link being clicked will be sent to link click detection module 324 by link selection module 238.

The optional browser detection module 326 detects the type of browser used by a user 106 (FIG. 2) on client 200 (FIG. 2). In some embodiments, the browser module 224 will report its type to web server module 328, which will report the type to browser detection module 326. In some embodiments, browser detection module 326 will work in conjunction with browser type detection module 270 (FIG. 2). In some embodiments, the indication of the link being clicked will be sent to browser detection module 326 by browser type detection module 270. In some embodiments, browser detection module 326 will determine the browser type based on data received from client 200 or on meta-data associated with this data, such as timing data.

Text entrance detection module 322 detects text entered by client 200 (FIG. 2) and also meta-data associated with that text, such as timing data. Timing data may include speed, cadence/consistency, pauses (or lack thereof), or corrections (or lack thereof). In some embodiments, the text (and/or meta-data) will be sent to text entrance detection module 322 by text entry module 236. In some embodiments, text detection module 322 is used along with other assistive technology detection module(s) 316 to determine that a user 106 (FIG. 1) is using assistive technology, such as a screen reader 243.

Inconsistency database 334 contains information about inconsistencies in user input. In some embodiments, this information allows assistive technology detection module(s) 316 to determine that a user 106 uses assistive-technology programs. In some embodiments, this information may be entered or updated by one or more assistive technology detection modules 316. It may comprise one or more types of databases, such as text, graph, dimensional, flat, hierarchical, network, object-oriented, relational, distributed, and/or XML databases. In some embodiments, inconsistency database 334 may be accessed publically. In other embodiments, inconsistency database 334 may be accessed only by one or more assisted technology detection modules 316 and/or other server application modules. In some embodiments, this database may be encrypted.

Optional user database 332 contains information related to users 106 (FIG. 1). In some embodiments, this data will comprise demographic data regarding the users 106. In some embodiments, it may comprise information about what types of browser modules 224 (FIG. 2) or client operating systems 216 are used by the users 106. In some embodiments, this data may be updated by browser detection module 326. It may comprise one or more types of databases, such as text, graph, dimensional, flat, hierarchical, network, object-oriented, relational, distributed, and/or XML databases. In some embodiments, user database 332 may be accessed publically. In other embodiments, user database 332 may be accessed only by one or more assisted technology detection modules 316, and/or other server application modules. In some embodiments, this database may be encrypted.

In some implementations, the server system 300 includes web or Hypertext Transfer Protocol (HTTP) servers, File Transfer Protocol (FTP) servers, as well as web pages and applications implemented using Common Gateway Interface (CGI) script, PHP Hypertext Preprocessor (PHP), Active Server Pages (ASP), Hyper Text Markup Language (HTML), Python, Extensible Markup Language (XML), Java, JavaScript, Asynchronous JavaScript and XML (AJAX), XHP, Javelin, Wireless Universal Resource File (WURFL), and the like.

Although FIG. 3 illustrates the server system 300 in accordance with some implementations, FIG. 3 is intended more as a functional description of the various features that may be present in one or more server systems than as a structural schematic of the implementations described herein. In practice, items shown separately could be combined and some items could be separated. For example, some items shown separately in FIG. 3 could be implemented on single servers and single items could be implemented by one or more servers. The actual number of servers used to implement the server system 300, and how features are allocated among them, will vary from one implementation to another and, optionally, depends in part on the amount of data traffic that the server system handles during peak usage periods as well as during average usage periods.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various implementations. In some implementations, memory 212 and 306 optionally store a subset or superset of the respective modules and data structures identified above. Furthermore, memory 212 and 306 optionally store additional modules and data structures not described above.

FIG. 4 is a flow diagram illustrating a method 400 of determining if a user is using a screen-reading assistive-technology program.

The steps of the method 400 may be performed by any combination of one or more clients 104 (FIGS. 1 and 2) and/or server system 102 (FIGS. 1 and 3). FIG. 4 corresponds to instructions stored in computer memory (e.g., memory 212 of the client 104, FIG. 2; memory 306 of the server system 102, FIG. 3; or other computer-readable storage medium. In some embodiments, method 500 may be performed entirely on a client 104.

Figure 4A:
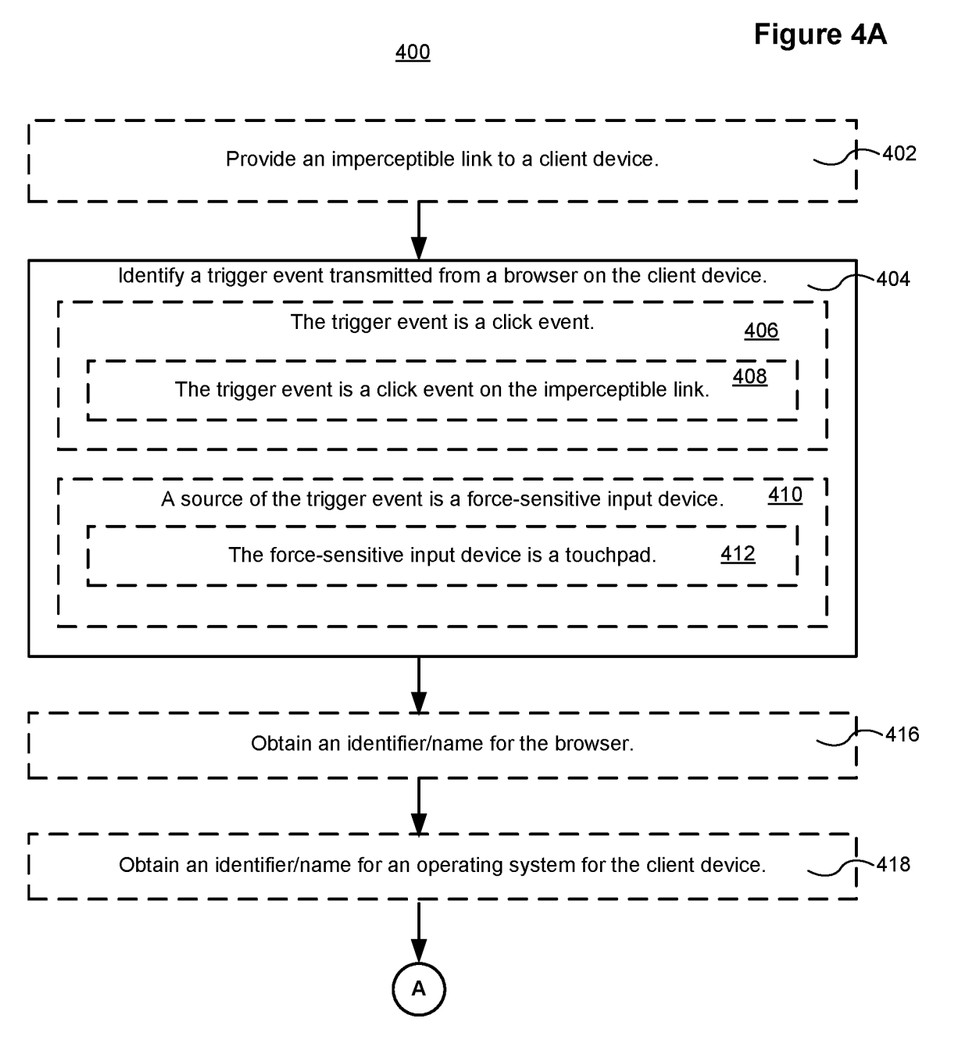
FIGS. 4A-4D illustrate a flow diagram illustrating a method of determining whether a user is using a screen reading program.

In some embodiments, in performing the method 400, in step 402, an electronic system having one or more processors and memory storing instructions for execution by the one or more processors provides an imperceptible link to a client device. For example, the system may provide a link that does not render on a screen 240 (FIG. 2), but which would be read by a screen reader 243 or another assistive-technology program. In some embodiments, the electronic system is a server 300 (FIG. 3).

In some embodiments, the electronic system will identify (404) a trigger event transmitted from a web browser on the client device 200 (FIG. 2). In some embodiments, rather than a browser module 224, the user 106 may be using a more specific client application module for a web-based service, such as a social media application module 226. For simplicity, generally only a web browser will be described, but one of skill in the art will appreciate that the invention applies equally well to custom client modules for a web service and client applications.

There are multiple methods of identifying a trigger event. For example, in some embodiments, the method can use "plug-in" client applications that work with web browser modules 224 to detect events. Based on the type of event being detected, these methods may include mouse event detection modules 225, a text entry detection module 227, or a cursor location detection module 225. In some embodiments, multiple such modules (and potentially other client application modules 230) will be used together. For example, in some embodiments, the method can use code transmitted from a server 300 to a client 200 that executes on the client 200 in a browser module 224. Examples include JavaScript, ActiveX, and other such languages. In some embodiments, both a "plug-in" and server-delivered script code will be used. In some embodiments, other techniques will be used, either by themselves, or in conjunction with a plug-in module or server-delivered script code.

In some embodiments, the trigger event is a text entry event. For example, text entry detection module 227 (FIG. 2) may notify text entrance detection module 322 (FIG. 3) on server 300 that text has been entered on a browser module 224.

In some embodiments, the trigger event is a click event (406). In some embodiments, the trigger event is (408) a click event on the imperceptible link. In some embodiments, the click event is a click on an imperceptible link on a page served by web server module 328. In some embodiments, a service on server 300 will generate a page containing or more imperceptible links to a user 106 that has already been identified as being a likely user of assistive technology, such as a screen reader 243.

Sometimes, a source of the trigger event is (410) a force-sensitive input device. In some embodiments, the force-sensitive input device is a touchpad (412), such as trackpad 245. The force-sensitive trackpad 245 may be capacitive. For example, in some embodiments, trackpad 245 may be Synaptics' ForcePad. For another example, the force-sensitive input device may be an Apple MacBook Force Touch Trackpad. The force-sensitive input device may also be a mouse 244 with a pressure-sensitive button or grip.

Figure 4B:
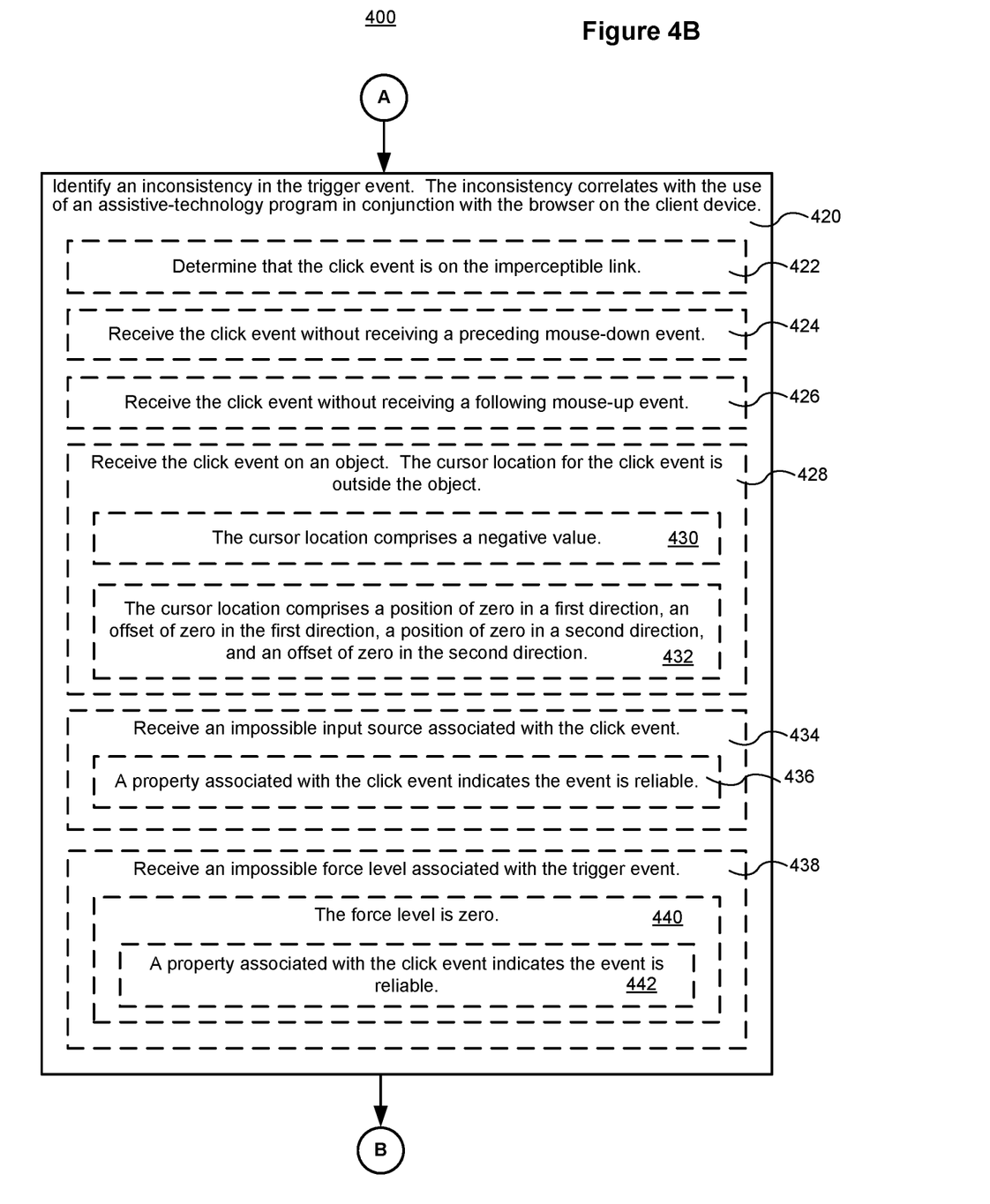

In some embodiments, the electronic system will obtain (416) an identifier or a name for the browser 224 (FIG. 2) on the client 200. In some embodiments, the identifier will be the name. In some embodiments, the identifier may comprise a code or string that contains information about the browser 224, including one or more of: name, version, configuration, computer type, or operating system. For example, the identifier may indicate the type of browser 224 is Google's Chrome v54.0.2840.99 m on a Windows 10 64-bit operating system 216 running on a computer comprising an Intel Core i5 vPro CPU 202. In some embodiments, the "browser" may be a social media application module 226. In such embodiments, the identifier may also comprise information related to the social media platform associated with the social media application module 226. In some embodiments, the identifier may comprise an XML document.

In some embodiments, the electronic system will obtain (418) an identifier or name for an operating system 216 (FIG. 2) for the client 200. In some embodiments, the identifier will be the name of the operating system. For example, the identifier could be "Windows 10" or "MacOS Leopard." In some embodiments, the identifier may comprise a code or string which contains information about the operating system 216, including one or more of: name, version, configuration, or computer type. For example, the identifier may indicate that the operating system 216 is Windows 10 v1.0.1 running on a Dell Inspiron computer running an Intel Core i7 CPU 202. In some embodiments, the identifier may comprise an XML document.

In some embodiments, the electronic system will identify (420) an inconsistency in the trigger event, where the inconsistency correlates with the use of an assistive-technology program in conjunction with the browser 224 (FIG. 2) on the client 200. In some embodiments, the assistive-technology program comprises a screen reader 243. In some embodiments, the assistive-technology program comprises an assisted input application 249. In some embodiments, the assistive-technology program comprises a voice recognition module 228. It will be appreciated that not all inconsistencies will by identified by every combination of client operating system 216 type, browser module 224 type, or assistive technology program type. It will also be appreciated that the use of some combinations of client operating system 216 type, browser module 224 type, or assistive technology program type may only result in one identified inconsistency and others result in identification of multiple inconsistencies.

In some embodiments, a list of inconsistencies will be stored in inconsistency database 334. Those of skill in the art will appreciate that while certain inconsistencies are described herein, additional inconsistencies will also indicate the use of assistive-technology programs such as screen readers 243 (FIG. 2) by a user 106 (FIG. 1) and that detecting inconsistencies such as these is within the scope of this invention.

In some embodiments, the inconsistency is determining that the text event is text entered in a manner inconsistent with text being entered on a keyboard 242 (FIG. 2). For example, text entrance detection module 322 (FIG. 3) may determine that the text was entered with a cadence that indicates it is being generated by an assisted input application 249.

In some embodiments, the inconsistency is determining (422) that the click event is on the imperceptible link. For example, a link that does not render on a screen 240 (FIG. 2), but which is read by a screen reader 243 may be clicked on by a user 106 of a client 200, indicating that the user 106 is using a screen reader. This is an example of an active identification, as it requires that web server module 328 (FIG. 3) on server 300 serve the client 200 a webpage that contains the imperceptible link.

Often, it is advantageous to detect that a user 106 is using an assistive-technology program, such as a screen reader 243 (FIG. 2) passively, without providing the client 200 with any special or modified web pages. This is helpful, for example, when the service does not have control over the specific web pages being served or does not want to send modified web pages to a client 200. As discussed previously with respect to steps 404 and 406, in some embodiments, trigger events, including click events, are received from clients 200. One such passive technique is to identify "inconsistencies" in those click events and, based on those inconsistencies, determine that a user 106 associated with the client device likely uses assistive-technology programs.

In some embodiments, the inconsistency is receiving (424) the click event without also receiving a preceding mouse-down event. For example, because a physical mouse 244 (FIG. 2) would generate a mouse-down event when the "clicking" button was depressed prior to the "click," the electronic system can determine that the click event may not have originated from a physical mouse 244 and may have originated from an assistive-technology program instead. Similarly, in some embodiments, the inconsistency is receiving (426) the click event without also receiving a following mouse-up event. For example, because a physical mouse 244 (FIG. 2) would generate a mouse-up event when the "clicking" button was released after a click, the electronic system can determine that the click event may not have originated from a physical mouse 244 and may have originated from an assistive-technology program instead. In some embodiments, certain versions of the Microsoft Edge browser module 224 are known not to generate mouse-up events after click events when used with an assisted input application 249 as an input device 208.

Figure 4C:
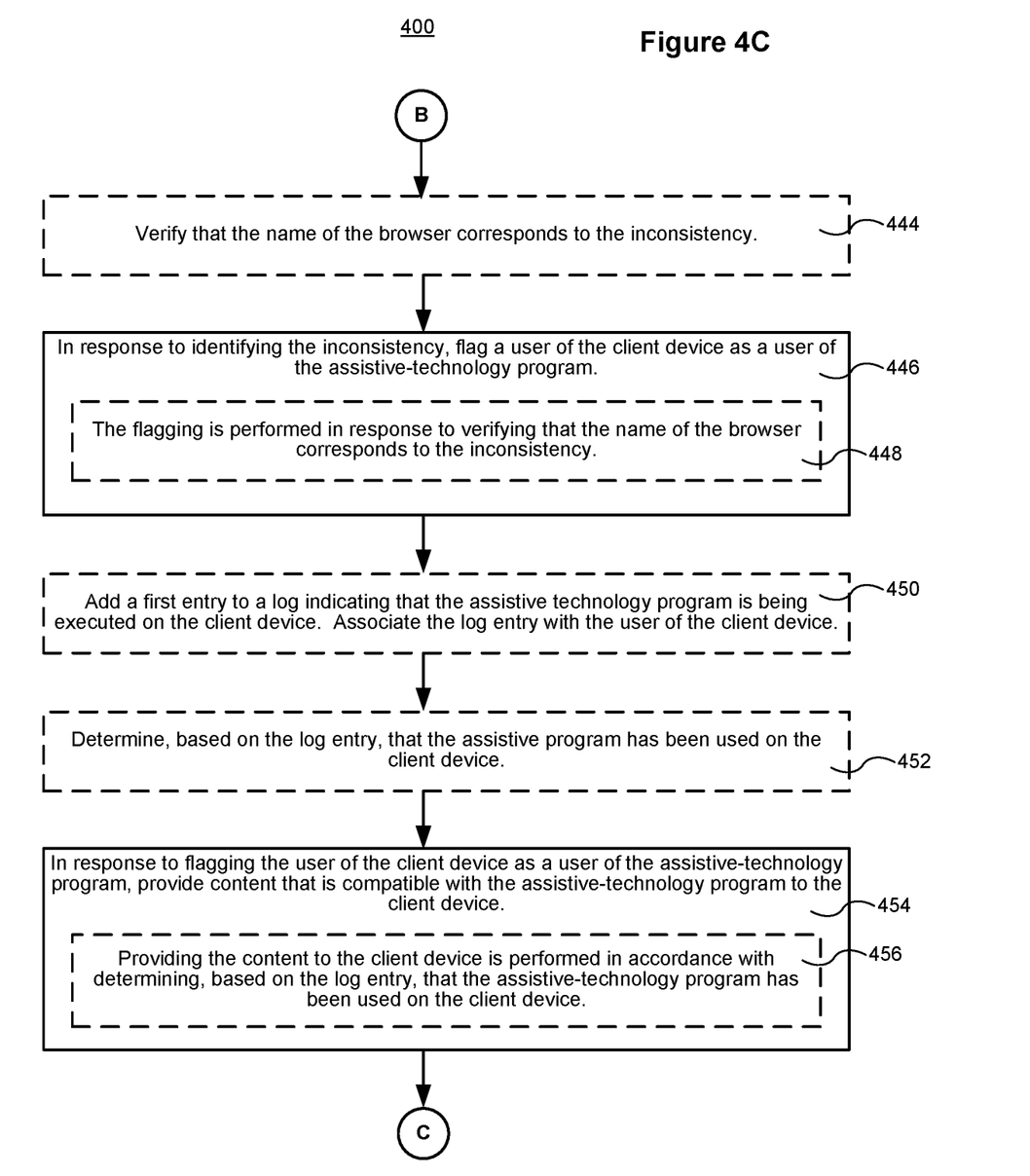

In some embodiments, the inconsistency is receiving (428) the click event on an object when the cursor location for the click event is outside the object. For example, a click event indicating that an image on a screen has been selected may be received when the cursor on client 200 is not on the image. For example, the cursor location may be at a valid positive location on a screen 240, but is still outside the object being clicked on. Because a typical click from a mouse 244 or trackpad 245 requires that the cursor be located on the object (e.g., an image or text link), the electronic system can determine that the click may have originated from an assistive-technology program. Additionally, some reported cursor locations may further indicate an assistive-technology program such as a screen reader 243 is being used. For example, the transmitted cursor location may comprise a negative value (430), which is an impossible cursor location. For another example, the cursor location may comprise a position of zero in a first direction, an offset of zero in the first direction, a position of zero in a second direction, and an offset of zero in the second direction (432). While such a cursor location is not impossible, it may be indicative that the cursor is not being used as a means to select objects to click. In some embodiments, certain versions of Microsoft's Edge, Mozilla's Firefox, and Google's Chrome browser modules 224 are known to report such cursor locations when used with an assisted input application 249 as an input device 208.

In some embodiments, input sources associated with a click event and corresponding to input devices 208 (FIG. 2) are received. For example, the received input source may indicate that the input device 208 associated with a click event is a mouse 244, a keyboard 242, or a trackpad 245. For example, in some embodiments, certain versions of Mozilla's Firefox browser module 224 report an enumerated list of input sources from 1-7 for physical devices. In some embodiments, the identified inconsistency comprises receiving (434) an impossible input source associated with the click event. For example, the input source may be an impossible value such as zero or a negative number. In some embodiments, the input source may be null. In some embodiments, certain versions of Mozilla's Firefox browser module 224 report an input source of zero when used with an assisted input application 249 as an input source 208.

In some embodiments, it may be possible to receive an "impossible" input source, such as when a "click event" is generated by a script running in the browser module 224 itself. For example, many popular websites include JavaScript or ActiveX code that runs on a browser 224, such as Chrome, Firefox, or Internet Explorer, and causes the browser 224 to return click events, despite no action being taken by a user 106. For example, in some embodiments, Mozilla's Firefox browser module 224 will send a click event with an input of zero in response to a "click" resulting from scripts in web pages. As explained above with respect to step 434, zero is the same input source certain versions of Mozilla's Firefox report when being used with assistive-technology programs. Accordingly, to decrease the likelihood of mistakenly determining that a user 106 is using an assistive-technology program due to script code running on the client browser, in some embodiments, the electronic system will receive a property associated with the click event that indicates the event is reliable (436). For example, the property may be "isTrusted."

In some embodiments, the click event is generated by a force-sensitive input device 208 (FIG. 2), such as a force-sensitive mouse 244 or a force-sensitive trackpad 245. Such devices may report a force level associated with click events, indicating the amount of force applied to the click, allowing some client application modules 222 to respond differently based on the force of the "click." For example, in certain versions of Apple's Safari browser 224 later than v7, Safari will send a force level to a web server module 328 when a click is performed on a webpage served by that web server module 328. In some embodiments, the identified inconsistency is receiving (438) an impossible force level associated with the trigger event. For example, the force level may be zero (440). In some embodiments, Apple's Safari browser will report a force level of zero when it is used with an assisted input application 249 as an input device 208. For another example, the force level may be null. For another example, the force level may be negative. For another example, the force level may be positive, but may be outside the range permitted by the specific input device 208.

In some embodiments, it may be possible to receive an "impossible" force level, such as when a "click event" is generated by a script running in the browser module 224 itself. For example, many popular websites include JavaScript or ActiveX code that runs on a browser 224, such as Chrome or Internet Explorer, and may cause the browser 224 to report click events, despite no action being taken by a user 106. To decrease the likelihood of mistakenly determining that a user 106 is using an assistive-technology program due to script code running on the client browser, in some embodiments, the electronic system will receive a property associated with the click event that indicates the event is reliable (442). For example, the property may be "isTrusted."

In some embodiments, the electronic system will verify (444) that the name of the browser module 224 (FIG. 2) corresponds to the inconsistency. For example, some inconsistencies apply to certain browser modules. For example, a given inconsistency may apply to Edge and Internet Explorer, but may not apply to Chrome, Firefox, or Safari. For example, certain versions of Microsoft's Edge browser module 224 on the Windows operating system 216 trigger a mouse-down event before a click event when used with assistive-technology programs, but do not trigger a mouse-up event. Certain older versions of Apple's Safari browser module 224 report mouse-up events when used with assistive-technology programs, but do so outside the boundaries of the object being clicked. Similarly, certain versions of Mozilla's Firefox, Google's Chrome, and Microsoft's Edge all report click events at the top corner of a window when used with assistive-technology programs, but Microsoft's Internet Explorer reports these events as coming from off of the screen 240. Further, it is possible that a perceived inconsistency could occur when a user 106 was not using assistive-technology programs. For example, an event could have not been detected by mouse event detection module 320 (FIG. 3) or an error on client 200 resulted in the event not being generated or not being properly transmitted. For this reason, it is important to identify not only an inconsistency, but also to identify the browser type being used when the inconsistency was detected. By doing so, the electronic system can have a higher level of confidence in its determination that the detected inconsistency was the result of use of an assisted input application 249.

In some embodiments, in response to identifying the inconsistency, the method flags (446) a user of the client device as a user of the assistive-technology program. For example, the electronic system may identify a user 106 (FIG. 1) as using a particular assistive-technology program or an assistive-technology program in general. In some embodiments, the flagging is performed (448) in response to verifying that the name of the browser corresponds to the inconsistency. This helps ensure that users are not improperly flagged as using assistive-technology programs. When a user 106 is flagged as being a user of an assistive-technology program, the user's information in user information database 254 (FIG. 2) or user database 332 (FIG. 3) may be updated. In some embodiments, the fact that the user uses an assistive technology program will be stored. In some embodiments, where it is possible to identify one or more specific assistive-technology programs used by the user (e.g., JAWS and Dolphin for a specific user 106), the names or identifiers of the specific programs may also be stored and associated with the user.

Figure 4D:
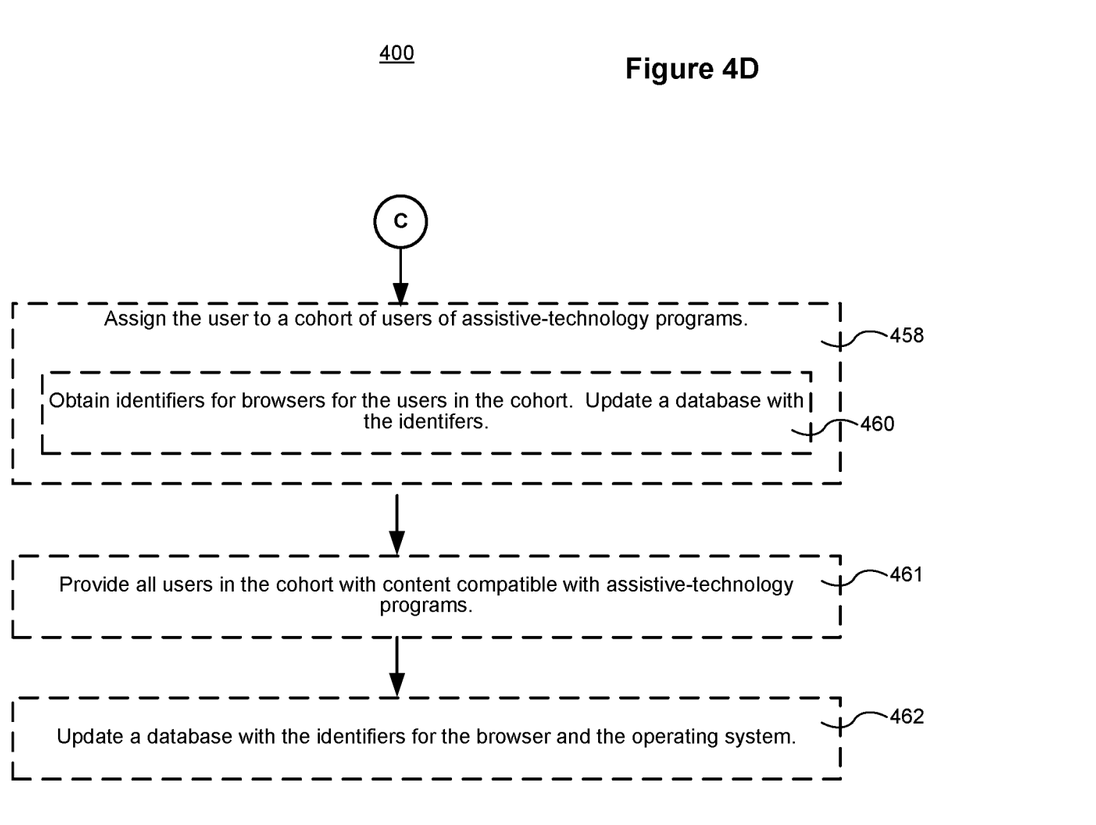

In some embodiments, the method adds (450) a first entry to a log indicating that the assistive-technology program is being executed on the client device 200. The log entry is associated with the user 106 (FIG. 1) of the client device.

In some embodiments, the method determines (452), based on the log entry, that the assistive-technology program has been used on the client device 200. It will be appreciated that the log entry may be a log entry generated by the method (such as in step 450). However, in some embodiments, the log entry may be from a log obtained from an external source. For example, the log could be purchased from an information broker or "big data" company. In some embodiments, log entries may be obtained from an external source, but verified by testing for one of the inconsistencies (or vice-versa).

In some embodiments, in response to flagging the user of the client device as a user of an assistive-technology program, the method provides (454) content that is compatible with the assistive-technology program to the client device 200. For example, if a user 106 (FIG. 1) was identified as using a screen reader 243 program, such as JAWS or NVDA, content on a web page will be delivered that is designed to be compatible with the screen reading program. By providing web pages that are compatible with the user's assistive-technology program(s), services on the electronic system will be better able to engage users using such technologies. In some embodiments, this will be accomplished by having separate versions of web pages (or separate versions of portions of web pages) that are served by web server module 328. For example, when the assistive technology detection module 316 determines that a user 106 is using an assistive-technology program, it may instruct web server module 328 to pull and serve a different web page (or a different portion of a web page) from web page storage 336 than web server module 328 would have otherwise pulled and served.

For example, a web service which had web pages containing, e.g., tables, columned content, hover-sensitive content (such as content which only appears when a cursor is on a screen location for a predetermined amount of time), pop-up or "scroll-up" windows, or other content that is not properly "read" by screen-reading programs such as screen reader 243, can create separate web pages which do not contain this content, or which contain the content formatted in a manner making it "readable" by the screen-reading programs. Additionally, even when web pages are "readable" by screen-reading programs, some formats of web pages may provide a higher reading experience for a user 106. Accordingly, web-based services can tailor certain versions of its pages to those users. By having separate versions of web pages, a service will be able to make enhancements to its web pages to improve the experience of users 106 who interact with the service via a screen 240, while ensuring that the enhancements do not degrade the experience of users of assistive-technology programs.

In some embodiments, providing the content to the client device is performed (456) in accordance with determining, based on the log entry that the assistive-technology program has been used on the client device. This can be used either as a primary means of deciding to provide assistive-technology compatible content to the client device 200, or as a means of verifying that a determination made based on an identified inconsistency (or multiple identified inconsistences) was correct. As discussed with respect to step 452, the log entry may have been generated by the method (e.g., step 450) or it may have been obtained from an external source.

In some embodiments, the method assigns (458) the user to a cohort of users of assistive-technology programs. This cohort may comprise users of multiple similar assistive-technology programs, such as screen readers, or it may comprise only users of a single assistive-technology program, such as JAWS. The association of the user 106 to the cohort may be stored in, e.g, user database 332 (FIG. 3). In some embodiments, the method obtains (460) identifiers for browsers for the users in the cohort and updates a database with the identifiers. For example, if a specific user was flagged as using an assistive-technology program, such as a screen reader 243, on Chrome, that information may be stored in user information database 254 or user database 332. By keeping track of the browsers used by users of assistive-technology programs, a service can improve the accuracy of its determinations that a user likely uses an assistive-technology program. Further, such data may be beneficial in tailoring web pages associated with the service to work on assistive-technology programs on specific browser types.

In some embodiments, the method provides (461) all users in the cohort with content compatible with assistive-technology programs. This process is described previously with respect to step 454.

In some embodiments, the method updates (462) a database with the identifiers for the browser 224 (FIG. 2) and the operating system 216 used by the user 106. In some embodiments, the method will update user information database 254, which will permit code (such as JavaScript) executing on a browser module 224 to determine that assistive-technology module 232 is being used, allowing the code to report that data to other web server modules 328 (FIG. 3) associated with other services on servers 300. In some embodiments, the method will update user database 332 with the browser 224 and the operating system 216 used by the user. This permits a service associated with server 300 to send assistive-technology compatible web pages to the user 106, even when the user is on a different client 200 or is using a different browser module 224 or social media application module 226. This data can also be used for detecting trends of browser usage in the sight-impaired community, such that when browser type detection module 270 subsequently detects the user 106 using a different browser module 224 than the one stored in the database(s), the record can be noted of the change. As similar changes are recorded for more users in a cohort, probability analysis can be done to identify trends, allowing a service, such as a social media service, to redesign pages in anticipation of more users in a cohort moving to the newer browser type. Further, as discussed with respect to step 444, certain inconsistencies apply only to a subset of browser types. However, newer browser modules 224 are being developed and newer versions of existing ones are being released. As described earlier, inconsistencies can vary even within different versions of the same browser 224. By keeping track of the browsers being used by users 106, especially those used by users determined to be using assistive-technology programs, a service can associate detected inconsistencies with newer browsers or newer versions of existing browser.

Although some of various drawings illustrate a number of logical stages in a particular order, stages which are not order dependent may be reordered and other stages may be combined or broken out. Furthermore, in some implementations, some stages may be performed in parallel and/or simultaneously with other stages. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:
    at an electronic system having one or more processors and memory storing instructions configured for execution by the one or more processors:
        receiving, from a browser on a client device, a location of a click event on an object having a predetermined boundary;
        receiving a location of a cursor on the client device, the location of the cursor corresponding to a time at which the click event occurred;
        identifying that the location of the cursor is outside of the predetermined boundary of the object;
        in response to identifying that the location of the cursor is outside of the predetermined boundary of the object, flagging a user of the client device as a user of an assistive-technology program; and
        in response to flagging the user of the client device as a user of the assistive-technology program, providing content that is compatible with the assistive-technology program to the client device.

2. The method of claim 1, further comprising, at the electronic system:
    assigning the user to a cohort of users of assistive-technology programs; and
    providing all users in the cohort with content compatible with assistive-technology programs.

3. The method of claim 2, further comprising, at the electronic system:
    obtaining identifiers for browsers for the users in the cohort; and
    updating a database with the identifiers.

4. The method of claim 1, further comprising, at the electronic system:
    obtaining an identifier for the browser;
    obtaining an identifier for an operating system for the client device; and
    updating a database with the identifiers for the browser and the operating system.

5. The method of claim 1, further comprising, at the electronic system:
    obtaining a name of the browser; and
    verifying that the name of the browser corresponds to the location of the cursor that is outside of the predetermined boundary of the object;
    wherein the flagging is performed in response to verifying that the name of the browser corresponds to the location of the cursor that is outside of the predetermined boundary of the object.

6. The method of claim 1, wherein the cursor location comprises a negative value.

7. The method of claim 1, wherein the cursor location comprises a position of zero in a first direction, an offset of zero in the first direction, a position of zero in a second direction, and an offset of zero in the second direction.

8. The method of claim 1, wherein identifying that the location of the cursor is outside of the predetermined boundary of the object further comprises determining that a property associated with the click event indicates the event is reliable.

9. The method of claim 1, further comprising, at the electronic system:
    adding a first entry to a log, wherein the entry indicates that the assistive technology program is being executed on the client device; and associating the entry with the user of the client device.

10. The method of claim 9, further comprising, at the electronic system:
   determining, based on the entry, that the assistive technology program has been used on the client device;
   wherein providing the content to the client device is performed in accordance with the determining.

11. An electronic system, comprising:
   one or more processors; and
   memory storing one or more programs configured for execution by the one or more processors, the one or more programs including instructions for:
      receiving, from a browser on a client device, a location of a click event on an object having a predetermined boundary;
      receiving a location of a cursor on the client device, the location of the cursor corresponding to a time at which the click event occurred;
      identifying that the location of the cursor is outside of the predetermined boundary of the object;
      in response to identifying that the location of the cursor is outside of the predetermined boundary of the object, flagging a user of the client device as a user of an assistive-technology program; and
      in response to flagging the user of the client device as a user of the assistive-technology program, providing content that is compatible with the assistive-technology program to the client device.

12. A non-transitory computer-readable storage medium storing one or more programs configured for execution by one or more processors, the one or more programs including instructions for:
   receiving, from a browser on a client device, a location of a click event on an object having a predetermined boundary;
   receiving a location of a cursor on the client device, the location of the cursor corresponding to a time at which the click event occurred;
   identifying that the location of the cursor is outside of the predetermined boundary of the object;
   in response to identifying that the location of the cursor is outside of the predetermined boundary of the object, flagging a user of the client device as a user of an assistive-technology program; and
   in response to flagging the user of the client device as a user of the assistive-technology program, providing content that is compatible with the assistive-technology program to the client device.

* * * * *